(12) United States Patent
Van Brocklin et al.

(10) Patent No.: US 7,672,213 B2
(45) Date of Patent: Mar. 2, 2010

(54) OPTICAL PRINT HEAD USING A GLASS ARM WAVEGUIDE

(75) Inventors: Andrew L. Van Brocklin, Corvallis, OR (US); Kuohua Wu, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1035 days.

(21) Appl. No.: 11/367,260

(22) Filed: Mar. 2, 2006

(65) Prior Publication Data

US 2007/0206085 A1    Sep. 6, 2007

(51) Int. Cl.
*G11B 7/00* (2006.01)
*B41J 27/00* (2006.01)

(52) U.S. Cl. .............................. 369/112.27; 369/112.28; 347/256

(58) Field of Classification Search ............ 369/112.27, 369/112.28, 112.21; 347/224, 256, 258–260, 347/262
See application file for complete search history.

(56) References Cited

U.S. PATENT DOCUMENTS

| | | | |
|---|---|---|---|
| 4,411,500 A | 10/1983 | Yonezawa et al. | |
| 4,626,679 A | 12/1986 | Kuwayama et al. | |
| 4,866,694 A | 9/1989 | Korth | |
| 5,070,488 A * | 12/1991 | Fukushima et al. | 369/44.12 |
| 5,214,630 A | 5/1993 | Goto et al. | |
| 5,311,496 A * | 5/1994 | Whitehead | 369/112.21 |
| 5,481,515 A * | 1/1996 | Kando et al. | 369/44.12 |
| 5,751,690 A * | 5/1998 | Ohira et al. | 369/275.3 |
| 6,829,080 B2 * | 12/2004 | Morikawa et al. | 359/332 |
| 7,015,939 B2 * | 3/2006 | Honda et al. | 347/225 |
| 7,324,129 B2 * | 1/2008 | Hanks | 347/225 |
| 7,355,945 B2 * | 4/2008 | Shimada et al. | 369/112.01 |
| 2002/0126975 A1 | 9/2002 | Huang | |
| 2005/0046692 A1 | 3/2005 | Bronson | |

FOREIGN PATENT DOCUMENTS

| | | |
|---|---|---|
| EP | 0272724 | 6/1988 |
| EP | 0470807 | 2/1992 |

OTHER PUBLICATIONS

PCT International Search; Application No. PCT/US2007/005532; filed Mar. 2, 2007; report issued Aug. 3, 2007.

* cited by examiner

*Primary Examiner*—Thang V Tran (57) ABSTRACT

This invention relates to an optical mechanism comprising: an optical beam generating mechanism to generate an optical beam; and a unitary, transparent waveguide for guiding the optical beam to an optically writable surface wherein optical elements for guiding the optical beam are coated onto the waveguide to create a relatively compact optical system, a relatively low exit numerical aperture for the exit pupil, and for bending and re-directing the optical beam.

22 Claims, 8 Drawing Sheets

OPTICAL PRINT HEAD USING A GLASS ARM WAVEGUIDE

BACKGROUND OF THE INVENTION

1. Field of the Invention

This invention relates to an optical mechanism comprising: an optical beam generating mechanism to generate an optical beam; and a unitary, transparent waveguide for guiding the optical beam to an optically writable surface wherein optical elements for guiding the optical beam are coated onto the waveguide to create a relatively compact optical system, a relatively low exit numerical aperture for the exit pupil, and for bending and re-directing the optical beam.

2. Description of the Related Art

Prior to the present invention, as set forth in general terms above and more specifically below, it is known that optical disc drives have historically been used to optically read data from and optically write data to data regions of optical discs. More recently, optical disc drives have been used to optically write images to label regions of optical discs. For example, a type of optical disc is known in which a laser or other optical beam can be used to write to the label side of an optical disc.

A costly component of an optical disc drive is the optical pickup unit (OPU). The OPU is the optical mechanism by which an optical beam is generated, and then guided to the surface of an optical disc using a number of precisely arranged lenses and other components, including an objective lens, which have to be manufactured to high tolerances, and thus at high cost. Therefore, optical disc drives typically only have one OPU for cost and complexity reasons. An optical drive having just a single such optical mechanism for accessing both the label and the data sides of an optical disc, however, forces a user to remove the disc from the drive, flip it over, and reinsert the disc back into the drive when the optical drive needs to access the data side after having accessed the label side, and vice-versa. Consequently, a more advantageous optical disc drive, then, would be provided if only one OPU could be utilized.

It is also known, that conventional optical print heads (OPHs) use a non-waveguide optical path in the optical disk drive. The non-waveguide optical path can be constructed of plastic or metallic materials. The discrete optical components (objective lens, collimator, prism, and quarter wave element) are then cemented to the non-waveguide arm or optical pickup unit (OPU)-sled assembly. The alignments of these optical components are very critical to the quality of the OPH. Also, the alignments can be costly as well as time consuming. Therefore, a further advantageous OPH, then, would be provided if a glass/quartz (or any high transmit and low birefringence material for labeling wavelength) are could be used in the OPH for disk labeling.

It is further known to use a unitary wave guide arm wherein optical elements are secured to the wave guide to provide the necessary reflection/refraction surfaces. As discussed above, the optical elements alignments and optical beam generating mechanism alignments are very critical to the quality of the OPH. Also, the alignments can be costly as well as time consuming. Finally, these type of wave guides utilize an extremely long path length.

It is apparent from the above that there exists a need in the art for a unitary, transparent glass/quartz (or any high transmit material for labeling wavelength) waveguide that utilizes optical elements that are placed onto the waveguide such that the waveguide creates a more compact assembly, employs a relatively low numerical aperture for the exit pupil that can be used in the OPH for disk labeling, and reduces the number of alignments. It is a purpose of this invention to fulfill this and other needs in the art in a manner more apparent to the skilled artisan once given the following disclosure.

SUMMARY OF THE INVENTION

Generally speaking, an embodiment of this invention fulfills these needs by providing an optical mechanism comprising: an optical beam generating mechanism to generate an optical beam; and a unitary, transparent waveguide for guiding the optical beam to an optically writable surface wherein optical elements for guiding the optical beam are coated onto the waveguide to create a relatively short optical beam path length, a relatively low numerical aperture for the exit pupil, and for bending and re-directing the optical beam.

In certain preferred embodiments, the optical beam generating mechanism is capable of generating an optical beam through the use of a laser diode. Also, the waveguide is constructed of any suitable moldable material upon which the optical elements such as multilayer anti-reflective, polarization separation coatings and reflective coatings can be placed such that the coatings have a high enough transmission and low enough birefringence. Finally, the optical mechanism measures characteristics of that beam as it is reflected back from the optically writable surface.

In another further preferred embodiment, a unitary, transparent glass/quartz (or any high transmit material and low birefringence for labeling wavelength) waveguide that utilizes optical elements that are placed onto the waveguide such that the waveguide creates a more compact assembly, employs a relatively low numerical aperture that can be used in the OPH for disk labeling, reduces the number of disparate optical elements, and reduces the number of alignments is disclosed.

The preferred optical mechanism, according to various embodiments of the present invention, offers the following advantages: lightness in weight; a more compact assembly; a relatively low numerical aperture; and decreased optical element/optical beam generating mechanism alignment complexity. In fact, in many of the preferred embodiments, these factors of shorter optical beam path length, lower numerical aperture, and decreased optical element/optical beam generating mechanism alignment complexity are optimized to an extent that is considerably higher than heretofore achieved in prior, known optical mechanisms.

The above and other features of the present invention, which will become more apparent as the description proceeds, are best understood by considering the following detailed description in conjunction with the accompanying drawings, wherein like characters represent like parts throughout the several views and in which:

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
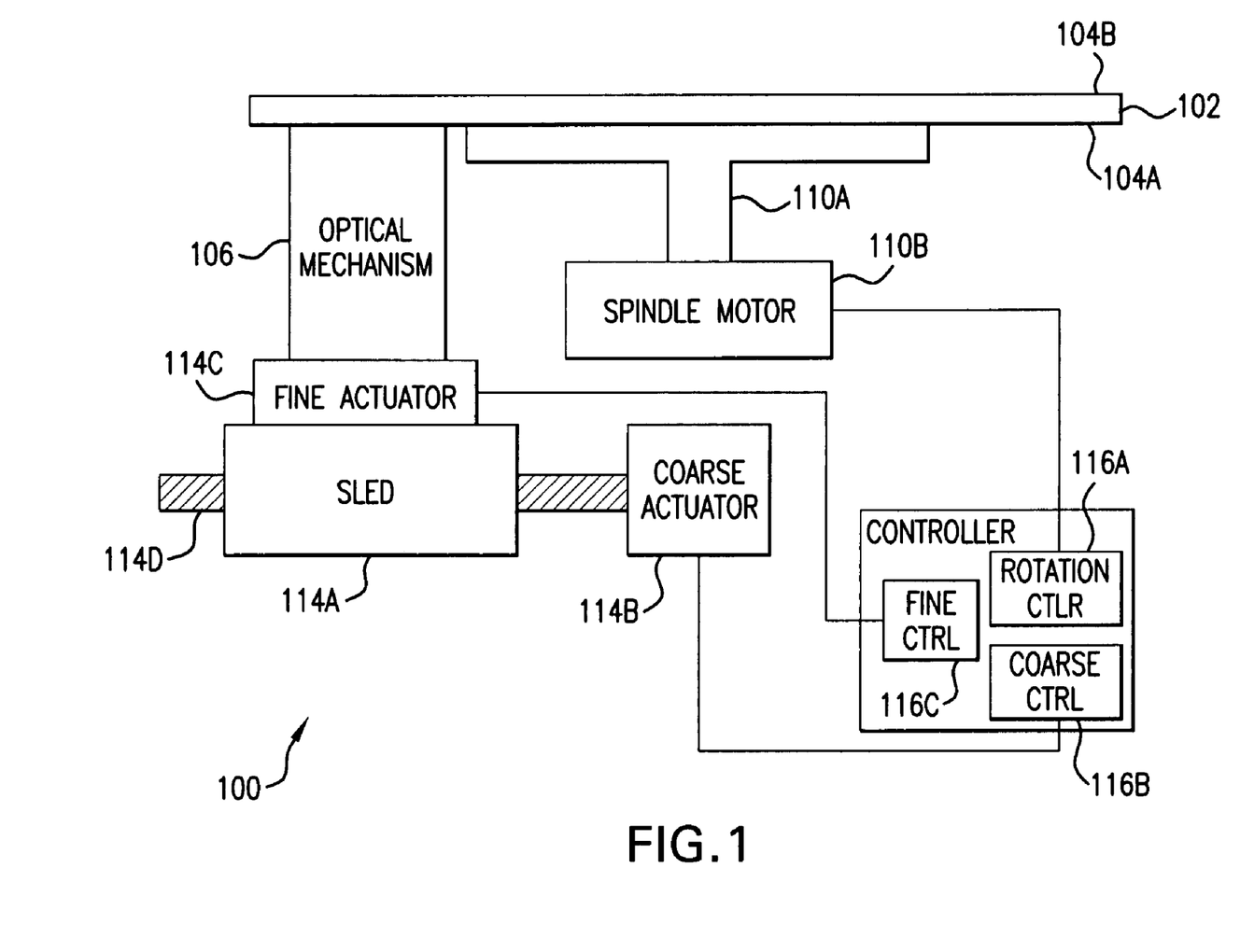
FIG. 1 is a diagram of an optical disc drive, according to an embodiment of the present invention.

With reference first to FIG. 1, there is illustrated one preferred embodiment for use of the concepts of this invention. FIG. 1 shows an optical disc drive 100, according to an embodiment of the invention. The optical drive 100 is for reading from and/or writing to an optical disc 102 which has a label side 104A opposite a data side 104B. More specifically, the optical drive 100 is for reading from and/or writing to an optically writable label side 104A of the optical disc 102, and/or an optically writable label side 104B of the optical disc 102, which are collectively referred to as the sides 104 of the optical disc 102.

The optically writable data side 104B of the optical disc 102 includes a data region on which data may be optically written to and/or optically read by the optical drive 100. The data side 104B is thus the side of the optical disc 102 to which binary data readable by the optical drive 100 and understandable by a computing device is written, and can be written by the optical drive 100 itself. For instance, the data side 104B may be the data side of a compact disc (CD), a CD-readable (CD-R), which can be optically written to once, a CD-readable/writable (CD-RW), which can be optically written to multiple times, and so on. The data side 104B may further be the data side of a digital versatile disc (DVD), a DVD-readable (DVD-R), or a DVD that is readable and writable, such as a DVD-RW, a DVD-RAM, or a DVD+RW. The data side 104B may further be the data side of a high-capacity optical disc, such as a Blu-ray optical disc, and so on. Furthermore, there may be a data region on each side of the optical disc 102, such that the optical disc is double sided, and such that there is a label region on at least one of the sides of the disc.

The optically writable label side 104A of the optical disc 102 includes a label region on which an image may be optically written thereto, to effectively label the optical disc 102. The label side 104A is thus the side of the optical disc 102 to which visible markings can be optically written to realize a desired label image. It is noted in one embodiment that both the sides 104A and 104B of the optical disc 102 may have both label regions and data regions.

The optical drive 100 is depicted in FIG. 1 as including an optical mechanism 106. Different and specific embodiments of the optical mechanism 106 are described in detail later in the detailed description. In general, however, the optical mechanism 106 does not employ an objective lens, and further employs a unitary, transparent waveguide to direct a generated optical beam to the surface of the optical disc 102. As such, the optical mechanism 106 is advantageous because it may not need costly, complex, and precisely arranged lenses and other components.

In particular, the optical mechanism 106 employing a unitary, transparent waveguide, and not employing an objective lens, is applicable to using the optical mechanism 106 to optically write to the label side 104A of the optical disc 102, because less precision is needed to optically write to and/or read from the label side 104A, as opposed to optically writing to and/or reading from the data side 104B. In such an embodiment of the invention, the optical mechanism 106 may be referred to as an optical print head, because it is used to optically write marks to the label side 104A, to achieve a desired image on the label side 104A of the optical disc 102. However, in other embodiments, the optical mechanism 106 may also be able to be used to optically write to and/or read from the data side 104B, too.

The optical drive 100 is also depicted in FIG. 1 as including a spindle 110A and a spindle motor 110B, which are collectively referred to as the first motor mechanism 110. The spindle motor 110B rotates the spindle 110A, such that the optical disc 102 correspondingly rotates. The first motor mechanism 110 may include other components besides those depicted in FIG. 1. For instance, the first motor mechanism 110 may include a rotary encoder or another type of encoder to provide for control of the spindle motor 110B and the spindle 110A.

The optical drive 100 is further depicted in FIG. 1 as including a sled 114A, a coarse actuator 114B, a fine actuator 114C, and a rail 114D, which are collectively referred to as the second motor mechanism 114. The second motor mechanism 114 moves the optical mechanism 106 to radial locations relative to a surface of the optical disc 102. The coarse actuator 114B is or includes a motor that causes the sled 114A, and hence the fine actuator 114C and the optical mechanism 106 situated on the sled 114A, to move radially relative to the optical disc 102 on the rail 114D. The coarse actuator 114B thus provides for coarse or large radial movements of the fine actuator 114C and the optical mechanism 106.

By comparison, the fine actuator 114C also is or includes a motor, and causes the optical mechanism 106 to move radially relative to the optical disc 102 on the sled 114A. The fine actuator 114C thus provides for fine or small movements of the optical mechanism 106. The second motor mechanism 114 may include other components besides those depicted in FIG. 1. For instance, the second motor mechanism 114 may include a linear encoder or another type of encoder to provide for control of the coarse actuator 114B and the sled 114A. Note that it is possible to use a single motor for both actuations, under the condition that it has enough accuracy to provide acceptable print quality to the human eye. This single motor may or may not use an encoder strip to provide feedback to enhance accuracy of positioning and hence print quality. Furthermore, either or both of the motor mechanisms 110 and 114 may be considered as the movement mechanism of the optical drive 100.

It is noted that the utilization of a fine actuator 114C and a coarse actuator 114B, as part of the second motor mechanism 114, is representative of one, but not all, embodiments of the invention. That is, to radially move the optical mechanism 106 in relation to the optical disc 102, the embodiment of FIG. 1 uses both a fine actuator 114C and a coarse actuator 114B. However, in other embodiments, other types of a second motor mechanism 114C can be used to radially move the optical mechanism 106 in relation to the optical disc 102, which do not require both a fine actuator 114C and a coarse actuator 114B. For instance, a single actuator or other type of motor may alternatively be used to radially move and position the optical mechanism 106 in relation to the optical disc 102. One such alternative embodiment is described later, at the end of the detailed description.

The optical drive 100 is additionally depicted in FIG. 1 as including a controller 116. The controller 116 can in one embodiment include at least a rotation controller 116A, a coarse controller 116B, and a fine controller 116C. The mechanisms 116 may each be implemented in software, hardware, or a combination of software and hardware. The rotation controller 116A controls movement of the spindle motor 110B, and thus controls rotation of the optical disc 102 on the spindle 110A, such as the angular velocity of the rotation of the optical disc 102. The coarse controller 116B controls the coarse actuator 114B, and thus movement of the sled 114A on the rail 114D. The fine controller 116C controls the fine actuator 114C, and thus movement of the beam source 106A on the sled 114A.

Figure 3:
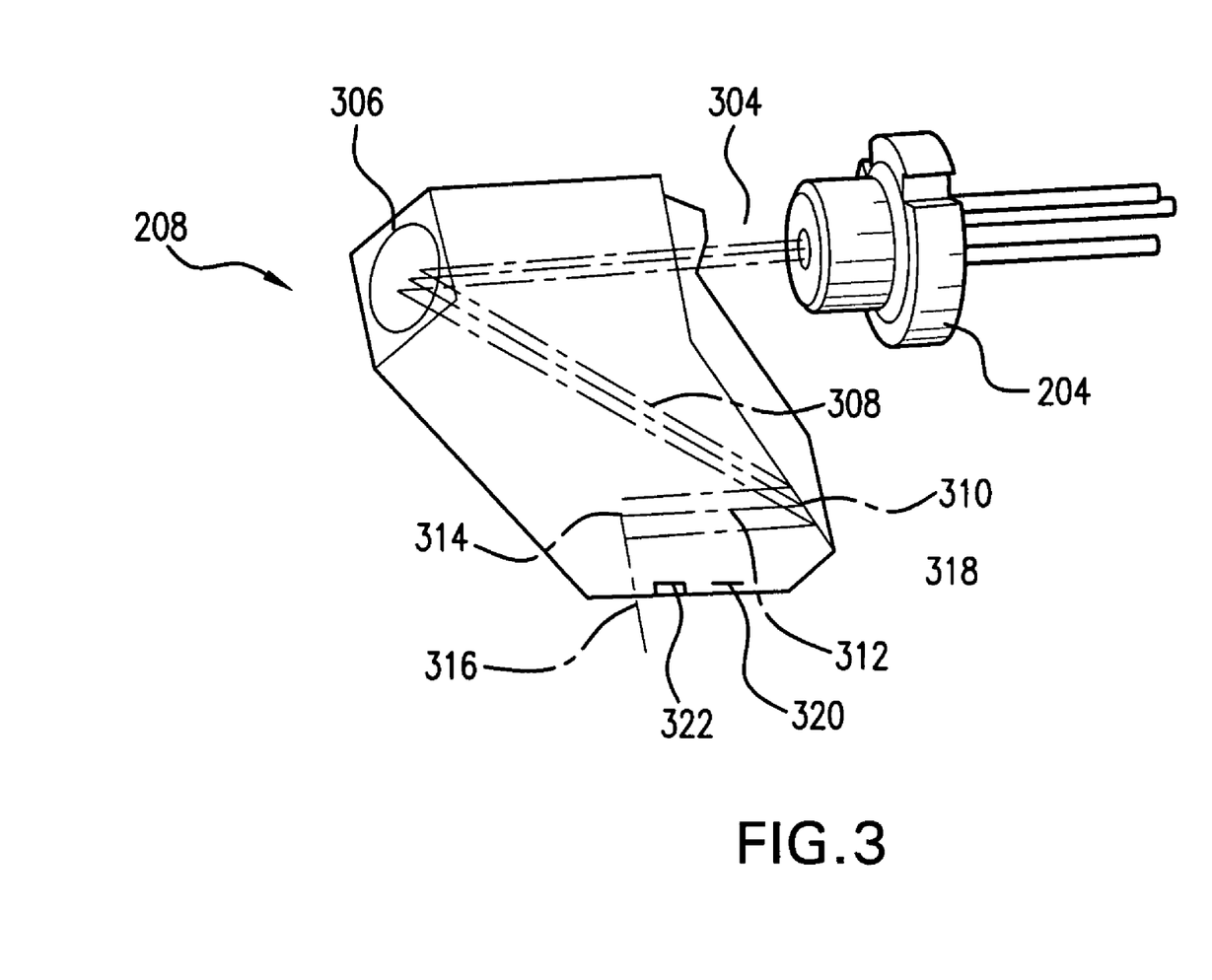
FIG. 3 is a schematic illustration a unitary, transparent waveguide for guiding the optical beam of FIG. 2, according to another embodiment of the present invention.

The controller 116 may further include other components besides those depicted in FIG. 1. For instance, the controller 116 can be responsible for turning on and off, and focusing, the optical beam 316 (FIG. 3). In addition, as can be appreciated by those of ordinary skill within the art, the components depicted in the optical drive 100 are representative of one embodiment of the invention, and do not limit all embodiments of the invention.

Figure 2:
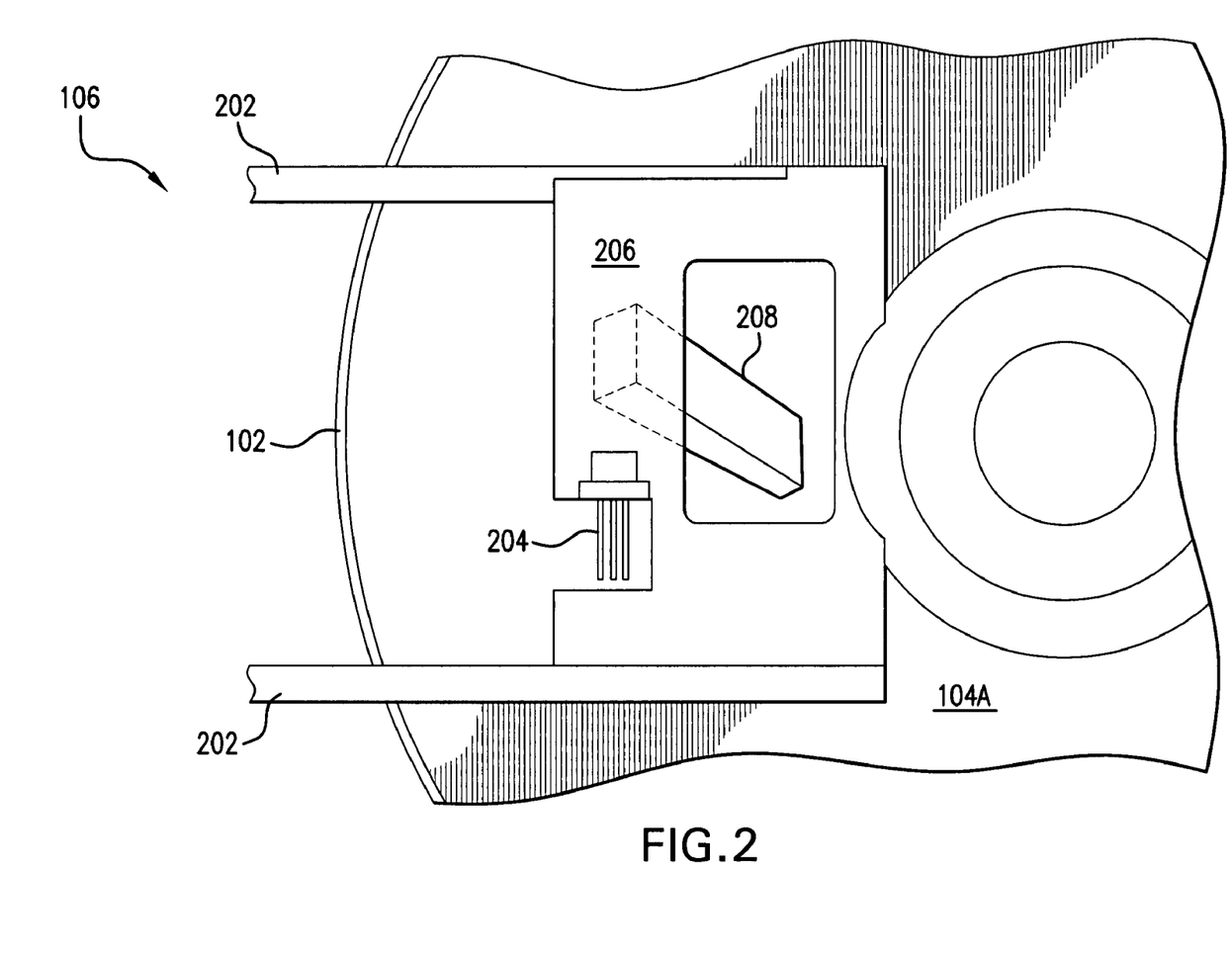
FIG. 2 is a top view illustration an optical mechanism for the optical disc drive of FIG. 1, according to one embodiment of the present invention.

FIG. 2 shows the optical mechanism 106 of the optical disc drive 100 in detail, according to an embodiment of the invention. The optical mechanism 106 includes carriage rails 202, an optical beam generating mechanism 204, a carriage 206, and unitary, transparent waveguide 208. The carriage rails 202 are rigidly connected to fine actuator 114C (FIG. 1). Carriage rails 202, preferably, are constructed of any suitable, durable material. Carriage 206 is rigidly connected to carriage rails 202. Carriage 206, preferably, is constructed of any suitable, durable material. Optical beam generating mechanism 204 is rigidly connected to carriage 206. Optical beam generating mechanism 204, preferably, includes a conventional laser diode that is capable of emitting a laser beam 304 (FIG. 3). One example of this diode is Sharp Corporation Japan's GH07P28 series of laser diodes. Unitary, transparent waveguide 208 is rigidly connected to carriage 206 such that an optical beam 304 originating from optical beam generating mechanism 204 can be traversed through waveguide 208 such that it interacts with the label side 104A of the optical disc 102 to produce marking. Waveguide 208, preferably, is constructed of any suitable, durable material that is capable of being molded. In particular, waveguide 208 is a single block of glass or polymeric material which provides all of the focusing optics and folding mirrors built in a single molded step. The multilayer coatings are placed on the waveguide after the molding process is complete. The multilayer coatings can be placed between two molding processes. Multilayer coatings provide mirror areas for the reflective optics and mirrors and areas of high transmission for light entering from the optical beam generating mechanism 204 and exiting onto label side 104A. The multilayer coatings can also create a beam splitter, a polarized beam splitter, an anti-reflective layer and other such reflective optics. Preferably, the total thickness required for optical mechanism 106 is 6.45 millimeters with a conventional 5.6 millimeter diameter optical beam generating mechanism 204. It is to be understood that other packages are available that can reduce this distance even further. It is to be further understood that since all the optics are formed in one molded step, the cost is very low and optical element alignment errors are reduced. Finally, the waveguide 208 creates a relatively compact optical system that exhibits low birefringence, a relatively low exit numerical aperture for the exit pupil, and for bending and re-directing the optical beam.

FIG. 3 shows the optical mechanism 106 in detail, according to another embodiment of the invention. Like-numbered components between FIG. 3 and FIG. 2 operate at least substantially the same between the optical mechanisms 106 of FIGS. 2 and 3, and the description of such components is not repeated in relation to FIG. 3 unless the manner by which they operate is different in relation to FIG. 3.

With respect to FIG. 3, waveguide 208 is illustrated. Waveguide 208 includes, in part, multi-layer, anti-reflective coating or lens 306, multi-layer reflective coating 310, multi-layer, anti-reflective coating or lens 314, and conventional laser beam sensor 318. During the construction of waveguide 208, waveguide 208 is molded. Portions of waveguide 208 are conventionally covered so that only the areas where anti-reflective coatings or lenses are to be placed are left uncovered. The anti-reflective coatings or lenses are then conventionally applied. It is to be understood that the anti-reflective coating or lens should be designed to work with the wavelength of interest. Also, the anti-reflective areas are conventionally covered and a reflective coating is conventionally placed on the remainder of waveguide 208. It is to be further understood that the reflective coating should be designed to work with the wavelength of interest. Finally, it is to be understood that an anti-reflective coating or lens is equal to a high transmission coating or lens. This means that a light beam will transmit through. On the other hand, a reflective coating highly reflects the light beam in an opposite direction such that no light beam is transmitted through.

During the operation of optical mechanism 106, a laser beam 304 is emitted from laser diode 204. Laser beam 304 enters into waveguide 208 and interacts with anti-reflective coating 306. Anti-reflective coating 306 causes the laser beam to transmit through/focus and form laser beam 308. Laser beam 308 interacts with reflective coating 310 to create laser beam 312. Laser beam 312 interacts with anti-reflective coating 314. After laser beam 312 interacts with anti-reflective coating 314, laser beam 312 is further transmitted through/focused such that laser beam 316 exits waveguide 208 and optically writes marks to the label side to achieve a desired image on the label side of the optical disc.

The reflected optical beam 320 is similarly routed back through waveguide 208 at curved section 322. Curved section 322 is also coated with the same multi-layer, anti-reflective coating, as discussed above. The reflected optical beam 320 is transmitted through/focused by curved section 322 such that it impinges upon conventional laser beam detector/sensor 318. The location of laser beam 316 is then conventionally monitored/adjusted, according to conventional techniques.

Figure 4:
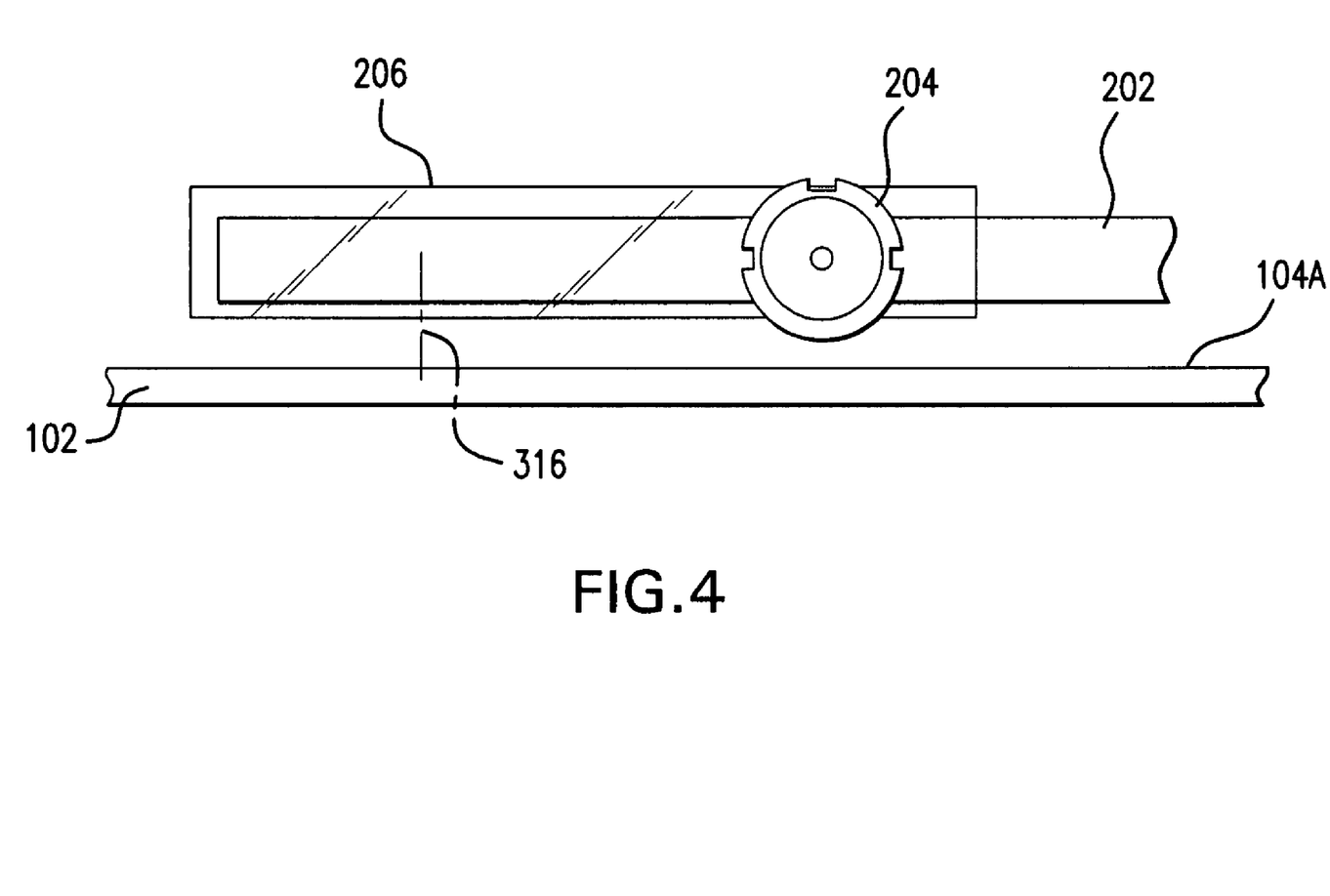
FIG. 4 is a side view illustration an optical mechanism for the optical disc drive of FIG. 2, according to another embodiment of the present invention.

FIG. 4 shows a side view of carriage rails 202, laser diode 204, and carriage 206. As shown in FIG. 4, laser beam 316 exits waveguide 208 and optically writes marks to the label side 104A to achieve a desired image on the label side 104A of the optical disc 102. Preferably, laser beam 316 should have a width of between 32 µm and 18 µm full width half maximum (FWHM) for proper labeling applications.

Figure 5:
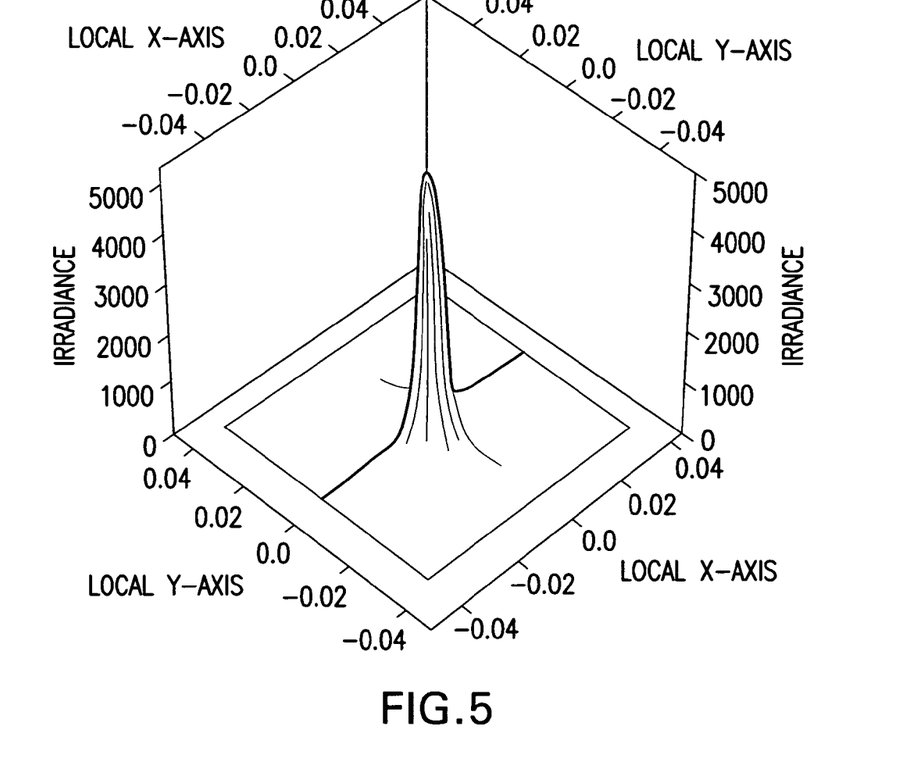
FIG. 5 is a graphical illustration of the intensity profile of the focused beam at the labeling layer, according to another embodiment of the present invention.

FIG. 5 shows the intensity profile of the focused beam 316 (FIG. 3) at the label side 104A (FIG. 1). This intensity profile demonstrates that the optical mechanism 106 can create a suitable intensity of the focused beam 316 (FIG. 3) at the label side 104A (FIG. 1).

Figure 6:
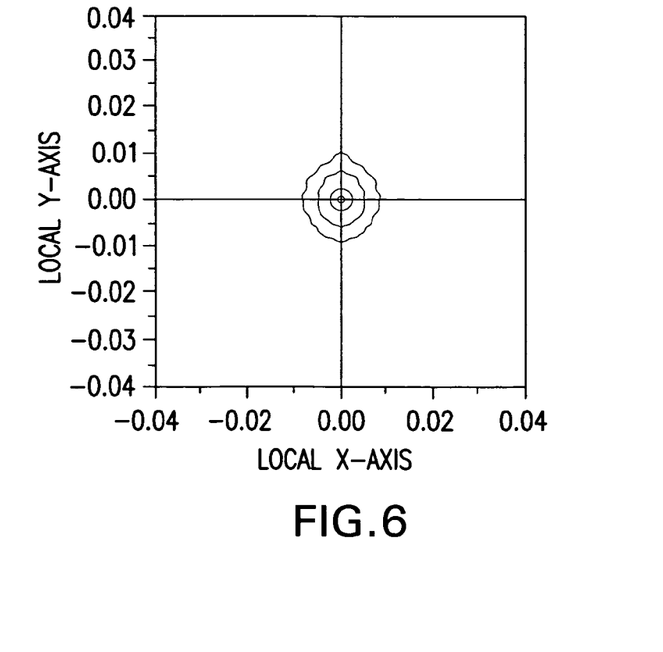
FIG. 6 is a graphical illustration diagram of the irradiance pattern of the focused beam at the labeling layer, according to another embodiment of the present invention.

FIG. 6 shows the irradiance pattern of the focused beam 316 (FIG. 3) at the label side 104A (FIG. 1). This irradiance pattern demonstrates that the optical mechanism 106 can create a suitable irradiance of the focused beam 316 (FIG. 3) at the label side 104A (FIG. 1).

Figure 7:
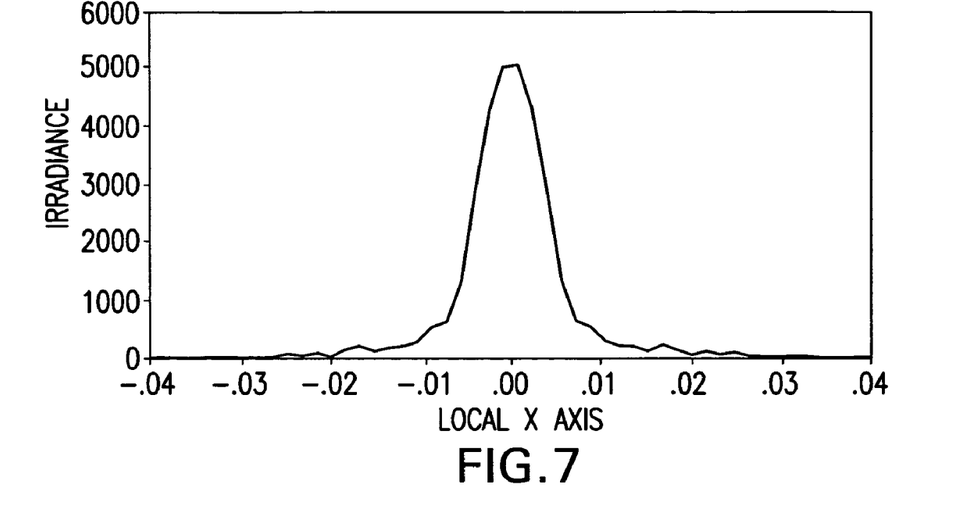
FIG. 7 is a graphical illustration of a x-intensity profile plot of the focused write beam at the labeling layer, according to another embodiment of the present invention.
Figure 8:
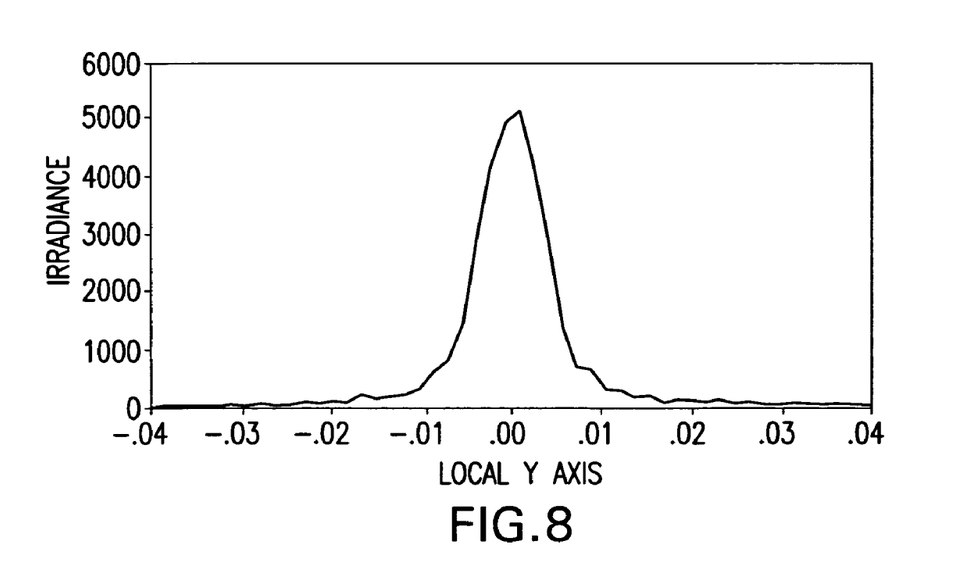
FIG. 8 is a graphical illustration of a y-intensity profile plot of the focused write beam at the labeling layer, according to another embodiment of the present invention.

FIG. 7 shows the intensity of the x-intensity profile of the focused beam 316 (FIG. 3) at the label side 104A (FIG. 1). FIG. 8 shows the intensity of the y-intensity profile of the focused beam 316 (FIG. 3) at the label side 104A (FIG. 1). Both profiles showed good axisymmetric Gaussian profile shapes.

The optical beam 316 is output onto the surface of the optical disc 102, such as the label side 104A, at a spot that may have a circular or an oval shape. In some situations, it may be desired to reduce the size, or the surface area, of this spot, for better precision and to achieve higher pixel density on the surface of the optical disc 102. Reducing the size of the spot at which the optical beam 212 is output from the waveguide 208 may be modified by changing the waveguide 208.

The optical mechanism 106 has been described as having an optical beam-generating mechanism 204 that is specifically, or that specifically includes, an optical beam diode, such as a laser diode, which emits an optical beam 304 that can be a laser beam, for instance. In other embodiments, the optical-beam generating mechanism 204 may be or include components other than an optical beam diode like a laser diode.

The optical mechanism 106 of various embodiments of the invention that have been described is at least for optically writing to the label side 104A of the optical disc 102. In one embodiment, the optical mechanism 106 may be able to be also employed to optically write to and/or optically read from the data side 104B of the optical disc 102. In such an embodiment, the optical disc 102 would have to be removed from the optical disc drive 100, flipped or turned over, and reinserted into the optical disc drive 100 for the optical mechanism 106 to access the label side 104A after the data side 104B of the optical disc 102 has been accessed, and vice-versa. This can be inconvenient for the user, however. In such situations, and in the embodiment where the optical mechanism 106 cannot be employed to optically write to and/or optically read from the data side 104B of the optical disc 102, the optical disc drive 100 may be modified to include two optical mechanisms, including the optical mechanism 106.

Figure 9:
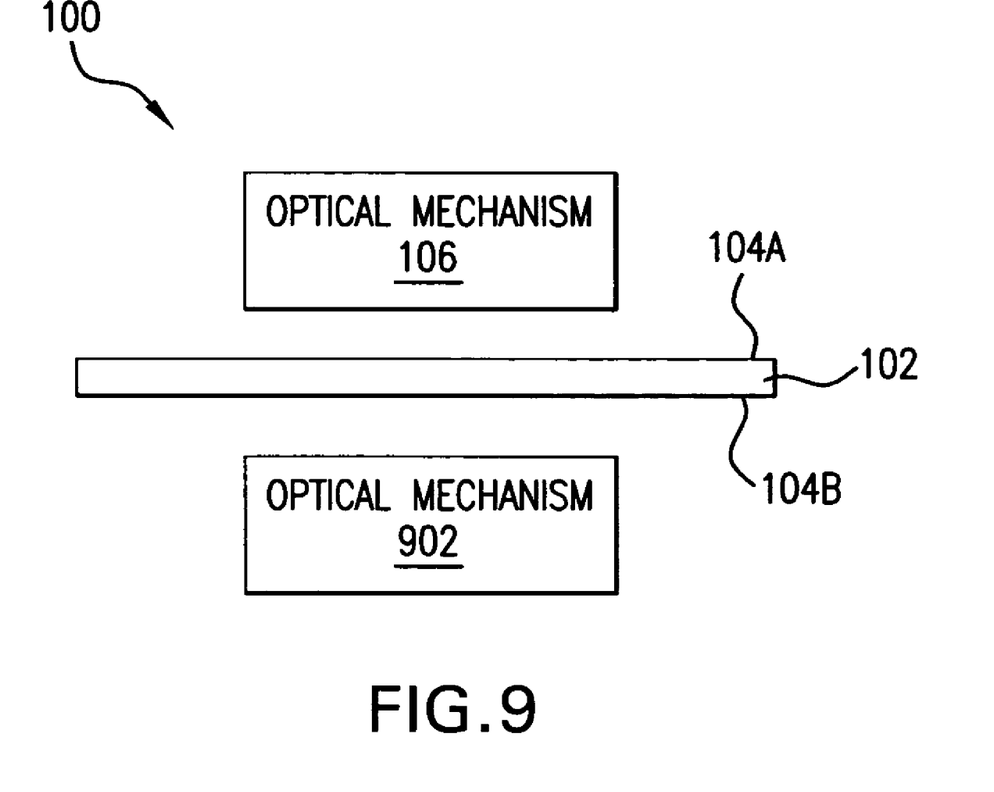
FIG. 9 is a diagram of an optical disc drive having two optical mechanisms for accessing both sides of an optical disc without having to have a user remove the disc from the drive, flip it over, and reinsert the disc into the drive, according to an embodiment of the invention.

FIG. 9 shows the optical disc drive 100, according to such an embodiment of the invention. In particular, the optical disc drive 100 includes the optical mechanism 106 that has been described, as well as another optical mechanism 902 situated or disposed opposite to the optical mechanism 106. The other components of the optical disc drive 100 that are depicted in FIG. 1, such as various motor mechanisms and controllers, are not shown in FIG. 9 for illustrative convenience. Furthermore, the optical disc drive 100 of FIG. 9 may have additional components besides those depicted in FIG. 9, such as one or more motor mechanisms for the optical mechanism 902. The optical mechanism 106 is incident to the label side 104A of the optical disc 102 that has been inserted into the optical disc drive 100, whereas the optical mechanism 902 is incident to the data side 104B of the optical disc 102 that has been inserted into the optical disc drive 100.

As a result, access to both the label side 104A and the data side 104B of the optical disc 102 can be achieved by the optical disc drive 100, without having to have the user remove the disc 102 from the drive 100, flip it over, and reinsert the disc 102 into the drive 100 for the drive 100 to access the label side 104A after having accessed the data side 104B, and vice-versa. The optical mechanism 106 can be in accordance with the embodiments of the invention that have been described, such that it does not employ an objective lens. By comparison, the optical mechanism 902 in one embodiment can be a conventional optical pickup unit (OPU), and thus employ an objective lens as well as other costly and complex components. In another embodiment, however, the optical mechanism 902 may be another instance of the optical mechanism 106 that has been described.

Figure 10:
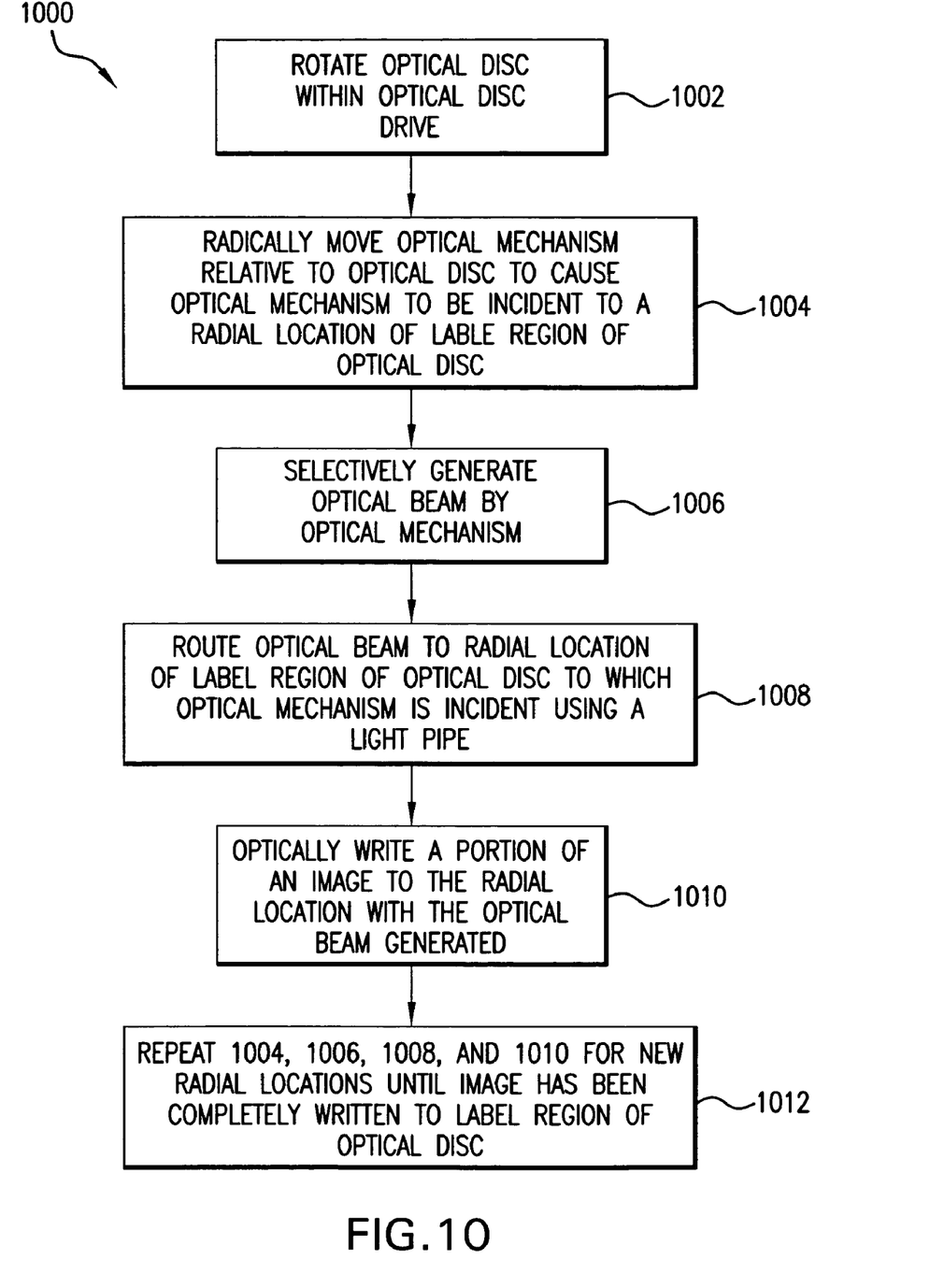
FIG. 10 is a flowchart of a method of use for an optical disc drive having an optical mechanism with a light pipe, according to an embodiment of the invention.

FIG. 10 shows a method 1000 for optically writing an image to the optically writable label side 104A of the optical disc 102 with the optical drive 100 having the optical mechanism 106 with the waveguide 208 that has been described, according to an embodiment of the invention. The method 1000 may thus be performed by the components of the optical drive 100 that have been described. At least some components of the method 1000 may be implemented as computer program parts of a computer program stored on a computer-readable medium. The medium may be a magnetic storage medium, such as a hard disk drive, an optical storage medium, a magnetic optical storage medium such as an optical disc, and/or a semiconductor storage medium, such as a memory, among other types of computer-readable media.

The optical disc 102 is initially rotated within the optical drive 100 (step 1002). The optical mechanism 106 is radially moved relative to the optical disc 102 to cause the optical mechanism 106 to be incident to a given radial location of a label region of the optical disc 102 (step 1004). For instance, where the optical mechanism 106 includes the carriage 206, the carriage 206, that has been described, can be rotated. The label region of the optical disc 102 can, in one embodiment, be the label side 104A of the optical disc 102. The optical beam 316 is then selectively generated by the optical mechanism 106 (step 1006).

The optical beam 316 is routed to the radial location of the label region of the optical disc 102 to which the optical mechanism 106 is incident using the waveguide 208, as has been described (step 1008). Routing of the optical beam 316 that is selectively generated and routed to the radial location of the label region of the optical disc 102, as the optical disc 102 is being rotated, therefore enables the optical beam 316 to optically write to this radial location a portion of an image to be optically written to the label region (step 1010). Steps 1004, 1006, 1008, and 1010 of the method 1000 are repeated for new radial locations of the label region of the optical disc 102, until the desired image has been completely written to the label region of the optical disc 102.

It is to be understood that the flowchart of the FIG. 10 shows the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction-execution system, apparatus or device such as a computer/processor based system, processor-containing system or other system that can fetch the instructions from the instruction-execution system, apparatus or device, and execute the instructions contained therein. In the context of this disclosure, a "computer-readable medium" can be any means that can store, communicate, propagate or transport a program for use by or in connection with the instruction-execution system, apparatus or device. The computer-readable medium can comprise any one of many physical media such as, for example, electronic, magnetic, optical, electro-magnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc. It is to be understood that the computer-readable medium could even be paper or another suitable medium upon which the program is printed, as the program can be electronically captured, via, for instance, optical scanning of the paper or other medium, then compiled, interpreted or otherwise processed in a single manner, if necessary, and then stored in a computer memory.

Those skilled in the art will understand that various embodiment of the present invention can be implemented in hardware, software, firmware or combinations thereof. Separate embodiments of the present invention can be implemented using a combination of hardware and software or firmware that is stored in memory and executed by a suitable instruction-execution system. If implemented solely in hardware, as in an alternative embodiment, the present invention can be separately implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies. In preferred embodiments, the present invention can be implemented in a combination of software and data executed and stored under the control of a computing device.

It will be well understood by one having ordinary skill in the art, after having become familiar with the teachings of the present invention, that software applications may be written in a number of programming languages now known or later developed.

Although the flowchart of the FIG. 10 shows a specific order of execution, the order of execution may differ from that which is depicted. For example, the order of execution of two or more blocks may be scrambled relative to the order shown. Also, two or more blocks shown in succession in FIG. 10 may be executed concurrently or with partial concurrence. All such variations are within the scope of the present invention.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for optically writing an image, comprising:
    rotating an optical mechanism rotated within an optical drive;
    radially moving the optical mechanism relative to an optical disc to cause the optical mechanism to be incident to a given radial location of a label region of the optical disc;
    selectively generating an optical beam by the optical mechanism;
    routing the optical beam to the radial location of the label region of the optical disc through a waveguide having a multilayer, reflective coating substantially located around the waveguide except where a plurality of lenses of the waveguide are located;
    writing to the label region of the optical disc by using the routed optical beam.

2. A method for optically writing an image, comprising:
    radially moving an optical mechanism relative to an optical disc rotated within an optical drive to cause the optical mechanism to be incident to a given radial location of a label region of the optical disc;
    selectively generating an optical beam by the optical mechanism;
    routing the optical beam to the radial location of the label region of the optical disc through a waveguide by
        focusing the optical beam by a first lens,
        reflecting the optical beam by a multilayer, reflective coating, and
        outputting the optical beam from the waveguide onto the radial location by a second lens.

3. The method, as in claim 1, wherein the method is further comprised of:
    monitoring/adjusting the location of the optical beam.

4. The method, as in claim 3, wherein the method is further comprised of:
    reflecting the optical beam from the optical disc;
    routing the optical beam through the waveguide; and
    impinging the laser beam upon a laser beam detector/sensor.

5. The method, as in claim 4, wherein the method is further comprised of:
    impinging the optical beam upon a curved section located substantially upon the waveguide; and
    focusing the optical beam by a third lens.

6. An optical system for optically writing an image, comprising:
    means for rotating an optical mechanism rotated within an optical drive;
    means for radially moving the optical mechanism relative to an optical disc to cause the optical mechanism to be incident to a given radial means for location of a label region of the optical disc;
    means for selectively generating an optical beam by the optical mechanism;
    means for routing the optical beam to the radial location of the label region of the optical disc through a waveguide having
        means for focusing the optical beam by a first lens,
        means for reflecting the optical beam by a multilayer, reflective coating, and
        means for exiting the optical beam from the waveguide by a second lens;
    means for writing to the label region of the optical disc by using the excited optical beam.

7. The system, as in claim 6, wherein the system is further comprised of:
    means for monitoring/adjusting the location of the optical beam.

8. The system, as in claim 7, wherein the system is further comprised of:

means for reflecting the optical beam from the optical disc;
means for routing the optical beam through the waveguide; and
means for impinging the laser beam upon a laser beam detector/sensor.

9. The system, as in claim 8, wherein the system is further comprised of:
means for impinging the optical beam upon a curved section located substantially upon the waveguide; and
means for focusing the optical beam by a third lens.

10. A computer readable medium having instructions for a method for optically writing an image, comprising:
rotating an optical mechanism rotated within an optical drive;
radially moving the optical mechanism relative to an optical disc to cause the optical mechanism to be incident to a given radial location of a label region of the optical disc;
selectively generating an optical beam by the optical mechanism;
routing the optical beam to the radial location of the label region of the optical disc through a waveguide having a multilayer, reflective coating substantially located around the waveguide except where a plurality of lenses of the waveguide are located;
writing to the label region of the optical disc by using the routed optical beam.

11. A computer readable medium having instructions for a method for optically writing an image, comprising:
rotating an optical mechanism rotated within an optical drive;
radially moving the optical mechanism relative to an optical disc to cause the optical mechanism to be incident to a given radial location of a label region of the optical disc;
selectively generating an optical beam by the optical mechanism;
routing the optical beam to the radial location of the label region of the optical disc through a waveguide, including
focusing the optical beam by a first lens,
reflecting the optical beam by a multilayer, reflective coating, and
exiting the optical beam from the waveguide by a second lens; and
writing to the label region of the optical disc by using the exited optical beam.

12. The medium, as in claim 10, wherein the method is further comprised of:
monitoring/adjusting the location of the optical beam.

13. The medium, as in claim 12, wherein the method is further comprised of:
reflecting the optical beam from the optical disc;
routing the optical beam through the waveguide; and
impinging the laser beam upon a laser beam detector/sensor.

14. The medium, as in claim 13, wherein the method is further comprised of:
impinging the optical beam upon a curved section located substantially upon the waveguide; and
focusing the optical beam by a third lens.

15. An optical disc drive, comprising:
an optical mechanism including an optical beam generator;
at least one actuator configured to radially move the optical mechanism relative to a rotatable optical disc in the drive to cause the optical mechanism to be incident to a given radial location of a label region of the optical disc; and
a waveguide configured to route an optical beam from the generator to the radial location to form a mark thereat, the waveguide having a multilayer, reflective coating substantially located around the waveguide except where a plurality of lenses of the waveguide are located.

16. The optical disc drive of claim 15, wherein the waveguide is unitary and transparent.

17. The optical disc drive of claim 15, wherein the waveguide has a relatively low exit numerical aperture for an exit pupil.

18. An optical disc drive, comprising:
an optical mechanism including an optical beam generator;
at least one actuator configured to radially move the optical mechanism relative to a rotatable optical disc in the drive to cause the optical mechanism to be incident to a given radial location of a label region of the optical disc; and
a waveguide configured to route an optical beam from the generator to the radial location to form a mark thereat, the waveguide including
a first lens configured to focus the optical beam,
a multilayer, reflective coating configured to reflect the optical beam, and
a second lens configured to exit the optical beam from the waveguide.

19. The optical disc drive of claim 18, wherein the waveguide includes a laser beam detector/sensor.

20. The optical disc drive of claim 18, wherein the optical disc drive does not includes an objective lens external to the waveguide.

21. The optical disc drive of claim 15, wherein the optical disc drive does not includes an objective lens external to the waveguide.

22. The optical disc drive of claim 18, wherein the waveguide includes a curved section comprising one of the plurality of lenses.

* * * * *

UNITED STATES PATENT AND TRADEMARK OFFICE
CERTIFICATE OF CORRECTION

PATENT NO. : 7,672,213 B2 Page 1 of 1
APPLICATION NO. : 11/367260
DATED : March 2, 2010
INVENTOR(S) : Andrew L. Van Brocklin et al.

It is certified that error appears in the above-identified patent and that said Letters Patent is hereby corrected as shown below:

In column 10, line 61, in Claim 6, delete "excited" and insert -- exited --, therefor.

Signed and Sealed this

Seventh Day of September, 2010

David J. Kappos
*Director of the United States Patent and Trademark Office*